Oct. 2, 1945.  F. C. EVANS ET AL  2,385,976
FIRE DETECTING SYSTEM
Filed March 6, 1940   3 Sheets-Sheet 1
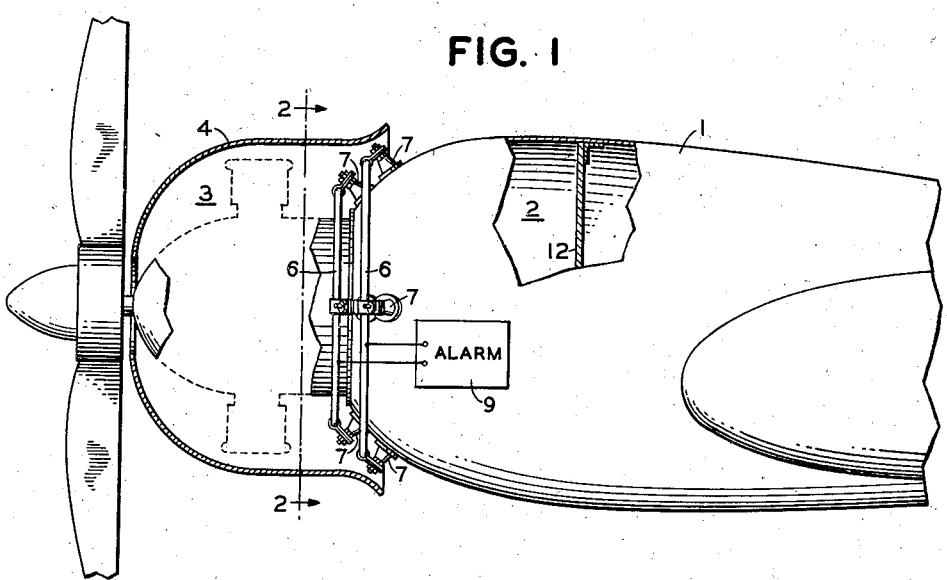
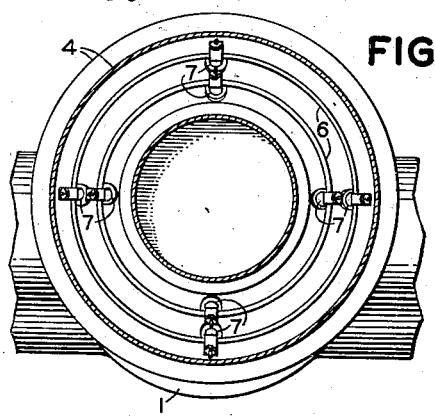
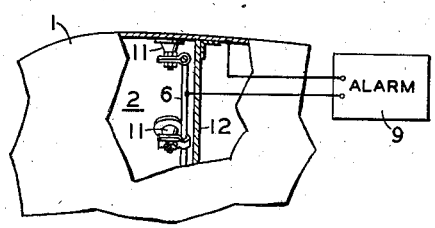
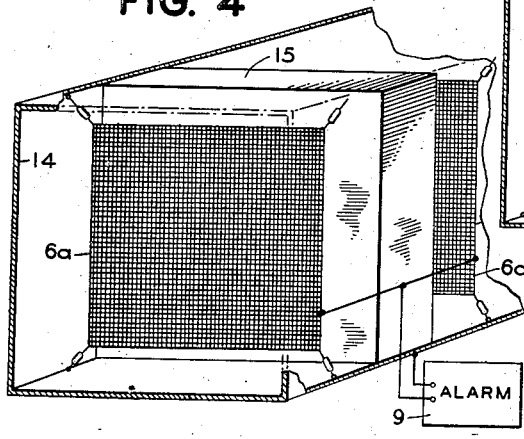
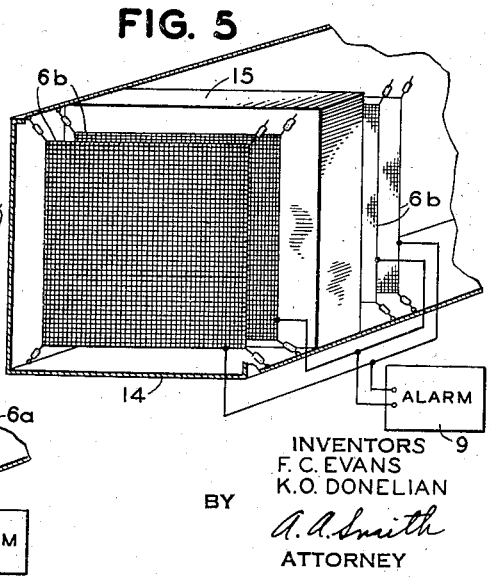
INVENTORS
F. C. EVANS
K. O. DONELIAN
BY
*A. A. Smith*
ATTORNEY Oct. 2, 1945.   F. C. EVANS ET AL   2,385,976
FIRE DETECTING SYSTEM
Filed March 6, 1940   3 Sheets-Sheet 2

PLATE CURRENT VS GRID VOLTAGE.

INVENTORS
F. C. EVANS
K. O. DONELIAN
BY a.a.Smith
ATTORNEY

Oct. 2, 1945.       F. C. EVANS ET AL        2,385,976
             FIRE DETECTING SYSTEM
             Filed March 6, 1940        3 Sheets-Sheet 3

INVENTORS
F. C. EVANS
K. O. DONELIAN
BY
*A. A. Smith*
ATTORNEY

Patented Oct. 2, 1945

2,385,976

UNITED STATES PATENT OFFICE 2,385,976

FIRE-DETECTING SYSTEM

Francis C. Evans, Dongan Hills, and Khatchik O. Donelian, New York, N. Y., assignors to American District Telegraph Company, Jersey City, N. J., a corporation of New Jersey Application March 6, 1940, Serial No. 322,590

3 Claims. (Cl. 177—355)

This invention relates generally to fire detection systems and more particularly to systems adapted to detect the presence of fire in high velocity streams of air such as in air conditioning systems or around the motor of an airplane where enormous quantities of air circulate at high velocity.

The fire detection problems in air conditioning systems and airplanes are closely related because a large volume of air is always circulated at high velocity through or around the most dangerous sources of fire. In an air conditioning system fires are very likely to occur in or in close proximity to oil filters while in airplanes fires usually occur around the motors and to the rear thereof. In both cases there are high velocity air currents present which prevent any appreciable instantaneous rise in temperature of the surrounding air itself. Thus it is very difficult to detect the presence of fire by means of temperature sensitive devices such as aero tubing or thermostatic devices. In airplanes it is necessary to provide instantaneous fire detecting means since the large supply of air causes excessively high temperature flames at certain points in the rear of the motor in a very short time interval. In fact the fire must be detected before the flame melts or reduces the strength of the surrounding structure of the airplane or the fire detecting apparatus itself. In air conditioning systems fires sometimes occur in the air filters and it is necessary that the flame itself be detected, as the fire is usually confined to one section of the filter and therefore the enormous quantity of air circulated through the filter prevents an appreciable change of temperature at other parts of the system where extinguishing apparatus such as sprinkler heads are located.

Accordingly the principal object of this invention is to provide a fire detecting system which operates instantaneously upon the occurrence of a small flame.

A further object of this invention is to provide a fire detecting apparatus suitable for use in airplanes or air conditioning apparatus which does not cause false alarms due to ambient heat such as that from hot exhaust pipes, heating units, or other local sources of heat.

A further object of this invention is to provide a fire detecting system wherein the detector is not affected or disabled by high velocity air streams.

A still further object of this invention is to provide a fire detecting system which does not depend upon the existence of a predetermined temperature for any appreciable length of time and which does not depend upon a predetermined rate of rise of temperature, whereby instantaneous fire detection is provided regardless of temperature change.

It has been found that the best method of detecting fire in accordance with the above objects is to use the principle involving ionization of air by a flame. Thus it is possible to provide an electrode under the cowling of an airplane and spaced from the airplane structure so that when a flame passes around the electrode, a circuit between the electrode and the airplane frame is produced thus initiating an alarm. In this type of system the smallest flame ionizes the gap between the electrode and the airplane structure to cause an instantaneous alarm thereby making it possible to prevent a high temperature from building up and the consequent destruction of the airplane structure. Instead of a single electrode, a pair of electrodes may be mounted within the cowling to accomplish the same result.

In air conditioning systems it has been found that fires are likely to occur in the air filters which use oil as a filtering medium, or wherever a filter can gather combustible material upon itself. Here again a high velocity air current presents a difficult fire detection problem in that temperatures do not build up at or near the source of the fire and consequently the use of rate of rise detection devices or thermostatic devices is not feasible. However, by using either the wire screens of the filter itself, or a number of external, spaced wire screens to create an air gap which may be ionized by a flame, it is possible to instantaneously detect the existence of a fire condition in spite of the high velocity air streams and the lack of change in temperature.

Since it is advantageous to use an ionized air gap as a fire detecting device, it is a further object of this invention to provide a circuit including flame detecting electrodes for the purpose of detecting fires.

A still further object of this invention is to provide a circuit including flame detecting electrodes which is capable of being supervised at all times against trouble conditions.

Still another object of this invention is to provide a supervised circuit including flame detecting electrodes which is adapted for the use of a galvanometer relay as an alarm relay and a trouble relay.

It is also a further object of this invention to provide circuits including flame detecting electrodes which are adapted for the use of vacuum tubes and associated relays for not only detecting fire conditions but also trouble conditions which may occur within the circuits.

Further objects and advantages of this invention will be evident after consideration of the following specification taken in conjunction with the attached drawings wherein:

Fig. 1 is an elevational view of an airplane showing fire detecting electrodes in protective relation to the plane structure;

Fig. 2 is a sectional view taken on line 2—2 of Fig. 1;

Fig. 3 is a fragmentary view of a portion of Fig. 1 showing a further modification of this invention;

Fig. 4 is a perspective view of an air duct in section having protective screens supported adjacent to the filters;

Fig. 5 is a perspective of a modification of the invention shown in Fig. 4;

Figure 6:
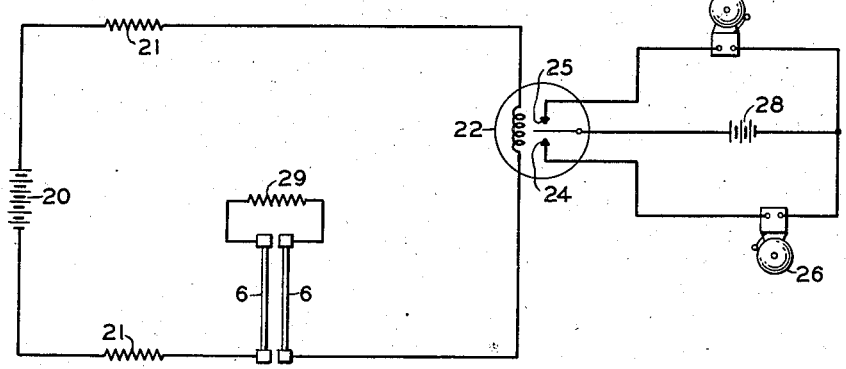
Fig. 6 illustrates a simple circuit involving the use of fire detecting electrodes.

This invention has two important applications in which it is particularly adaptable for the use of detecting flames, the first being in connection with fire detection in airplanes while the second is in connection with fire detection within air conditioning systems, particularly around air filters which contain oil as a filtering medium or gather combustible materials.

Figs. 1, 2 and 3 of the drawings illustrate the application of this invention to an airplane which comprises a body structure 1, a pump compartment 2 and a motor compartment 3, the motor compartment being surrounded by cowling 4. Since the air blast from the propeller carries the flame to the rear of the motor the best location for fire detecting apparatus is in the rear of the motor and in such a position that the detecting apparatus intercepts the path of the air flow and the path taken by the flames. Therefore a pair of flame detecting electrodes 6 may be supported on insulators 7 on the forward wall of the pump compartment 2 and between the wall and the rear portion of the cowling 4. The electrodes 6 are positioned as shown in Fig. 1 of the drawings to encircle the outer portion of the pump compartment wall. Thus as flames follow the path of the air currents they ionize the air gap between the electrodes and initiate an alarm in an electrical circuit 9 connected thereto which will be described in detail later on in the description.

Another electrode 6, shown in Fig. 3, may be supported on insulators 11 on the fire wall at the rear of the pump compartment 2, this also being a source of fire. In this case the body structure 1 of the plane may serve as a second electrode whereby flames passing between the electrode 6 and the fire wall 12 or other adjacent parts of the airplane structure will break down the air gap and cause an alarm in the circuit connected to the electrode and the framework of the airplane.

It is to be understood that it is intended that a pair of electrodes such as 6 or a single electrode and the body structure 1 of the airplane can be substituted for one another as flame detectors depending upon the requirements in the particular location selected for detecting a fire condition.

Because of the inherent characteristics of the structure explained above a fire is detected instantaneously since the flames themselves are carried by high velocity air currents to the electrodes and the flames ionize the air gap to cause an alarm. It is obviously not necessary that a predetermined temperature occur for a certain length of time since the apparatus does not depend upon temperature change for its operation. The high velocity air currents aid flame detection apparatus since they convey the flames whereas, if temperature responsive devices were utilized for detecting the fire, the high velocity air currents would prevent a rise of temperature to a degree sufficient for indicating a fire condition. Furthermore, exceedingly high temperatures occur around an airplane motor and idling periods of the motor would cause false alarms in temperature responsive devices.

Figs. 4 and 5 illustrate the application of the invention to an air conditioning system where it is desired to detect fires either within the filters or in the ducts. Fig. 4 of the drawings shows an air filter 15 which may be of the type which utilizes oil as a filtering medium and which is particularly subject to the occurrence of fires therein. Obviously, other types of filters may also be protected by this system and therefore the invention is not limited to oil filter protection. The fire detecting electrodes consist of wire screens 6a which are placed on either side of the air filter 15 to intercept the flow of air along the duct 14, the duct or filter being used as one electrode whereby occurrence of a flame between the screens 6a and the duct or filter will ionize the air gap and cause an alarm in the associated electrical alarm circuit.

An alternative arrangement in an air conditioning system is shown in Fig. 5 of the drawings and includes an air filter 15 and two pairs of screens 6b which are placed on either side of the filter 15, each pair of screens constituting a detecting element. A flame passing between either pair of screens 6b will ionize the air gap between the screens to again cause a fire alarm in the associated alarm circuit. In this application of the invention the screens are connected to the same type of circuit 9 as in the airplane application, said circuit being explained in detail later on in the description.

Where a single electrode is used either in an airplane or in an air conditioning system, any grounded metallic structure may serve as the other electrode to provide an ionizable air gap. Here again the flame detecting electrodes 6a and 6b present the same advantages as in connection with the airplane application shown in Figs. 1, 2 and 3, since enormous quantities of air flow through the filters 15 at high velocity and prevent high temperatures from occurring therein even though a fire may exist in the filters themselves or in the duct. This invention is also particularly adapted to air conditioning systems since it is customary to place sprinkler heads in the filters and in their immediate vicinity for the purpose of deluging the duct and the filters with fire extinguishing medium.

It frequently occurs that the fire is confined to the filters or one section thereof and the high velocity air currents prevent a rise of temperature sufficient to operate the sprinkler heads within the filters. This condition is prevented by providing control of the sprinkler system by the flame detector, thus insuring that the sprinkler within the filter is operated.

Fig. 6 shows the simplest form of alarm circuit such as shown at 9 in Figs. 1 and 3 for detecting flame by means of spaced electrodes. The circuit includes a source of potential 20 connected in series with current limiting resistors 21, galvanometer relay 22, and the spaced electrodes 6 such as those shown in Figs. 1 to 5. Alarm bell 26 is connected to the alarm contact 24 of relay 22 and trouble bell 27 is connected to the trouble contact 25 of relay 22. Battery 28 supplies potential for operating the alarm and trouble circuits. Resistor 29 bridges electrodes 6 for the purpose of completing the supervisory circuits whereby a supervisory current flows in the circuit. The resistor 29 may be of the order of ten megohms or of sufficient value to provide a path of higher resistance than the path between electrodes 6 when ionized, so that when this latter path is ionized current can flow readily thereacross.

When a flame passes between the electrodes 6 the air becomes ionized and conductive to such an extent that sufficient current flows through relay 22 to move its armature from the normal neutral position to contact 24 thereby completing the alarm circuit through battery 28 and operating alarm 26. The supervisory resistor 29 completes the series circuit across electrodes 6 and allows a small supervisory current to flow therein. If a break occurs in the circuit, the supervisory current flowing through resistor 29 is reduced to zero and relay 22 is actuated to close contact 25 and energize trouble signal 27 through battery 28.

Figure 7:
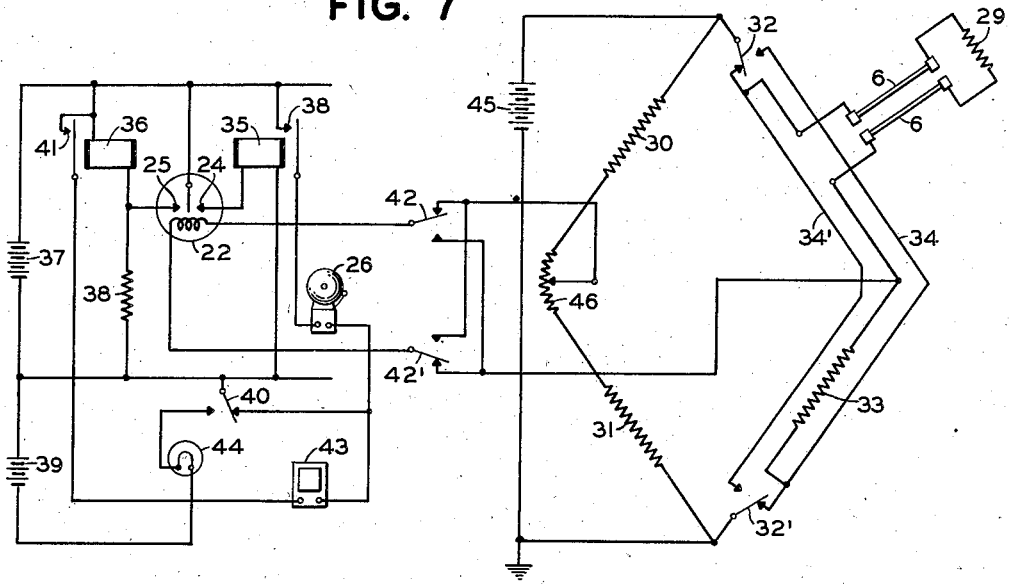
Fig. 7 illustrates a Wheatstone bridge application of the invention.

The preferred circuit for use at 9 in Figs. 1, 3, 4 and 5 for providing flame detection is shown in Fig. 7 of the drawings and includes a Wheatstone bridge comprising a galvanometer relay 22 connected between the junction of resistance arms 30 and 31 and the junction of resistance arm 33 and the remaining arm including the flame detecting electrodes 6. Battery 45 is connected across the other junction points in the bridge. The potentiometer 46 is provided for normally balancing the Wheatstone bridge so that as a flame breaks down the air gap between the detecting electrodes 6 the bridge becomes unbalanced and closes the alarm contact 24 of relay 22.

The supervising resistor 29 is connected across the flame detecting electrodes and has a very high resistance of, for example, ten megohms. Thus a small current flowing through the supervising resistor 29 permits the bridge circuit to be balanced by closing the circuit across the flame detecting electrodes. If a trouble condition such as an open circuit occurs in the electrode arm of the bridge, it will become unbalanced and relay 22 will close the trouble alarm contact 25.

As mentioned before, it is possible to use two detecting electrodes or one detecting electrode in combination with the metallic structure or ground of an airplane and an air duct in an air conditioning system. Therefore in order to permit the use of a ground the bridge circuit is provided with switches 32 and 32' together with the associated conductors 34 and 34' for reversing the connection of the lower electrode 6 and resistor 33 to the remainder of the bridge circuit. Switches 32 and 32' are shown in their normal position where no ground is used and the switches will be reversed when it is desired to use a grounded circuit. Thus in the case of a grounded circuit the switch 32 will establish a connection through conductor 34, resistance 33, the lower electrode 6 and resistor 29. Switch 32' establishes a connection from the upper electrode 6 which is now the frame structure of the air plane or air duct to the grounded side of the battery. Such changes in the connection as above described necessitate reversing the connections of galvanometer relay 22 and therefore switches 42 and 42' are provided for reversing the connection of relay 22 whereby it is always actuated in the same direction regardless of whether or not a grounded circuit is used. Switches 42 and 42' are shown in the no-ground position and in the case of a grounded circuit they would be operated to the other contacts in an obvious manner.

Galvanometer relay 22 controls the alarm relay 35 which is connected through alarm contact 24 of galvanometer relay 22 across the battery 37. Relay 22 also actuates trouble relay 36 which is connected across battery 37 in series with the current limiting resistor 38, relay 36 being connected to trouble contact 25 of relay 22 in such a manner that it may be shunted thereby. The alarm bell 26 is connected to the contact 38 and armature of relay 35 and across battery 37 in series with one contact of the silencing switch 40. Trouble buzzer 43 is also connected in series with the same contact of switch 40 and in series with the armature and contact 41 of relay 36, the entire series circuit being connected across battery 37. The trouble lamp 44 is connected across battery 39 in series with the left-hand contact of switch 40 whereby this switch may control either alarm bell 26, trouble buzzer 43, or trouble lamp 44.

In normal operation the bridge circuit is balanced whereby the relay 22 assumes a neutral position between contacts 24 and 25. When a fire occurs between electrode 6, the air between them becomes ionized and an unbalance occurs in the bridge circuit which causes relay 22 to move its armature to contact 24 thereby closing a circuit for relay 35 across battery 37. Relay 35 actuates its armature and makes contact 38 to close a circuit through bell 26 and switch 40 whereby battery 37 energizes the bell to initiate an alarm. The silencing switch 40 is then actuated to silence the alarm.

When a trouble condition occurs, the bridge circuit becomes unbalanced in the other direction and relay 22 closes contact 25 which creates a shunt circuit around the normally energized trouble relay 36, thereby closing the contact 41 to energize the trouble buzzer 43 through the silencing switch 40. Thus the switch 40 can again be opened to silence the trouble buzzer and energize a pilot light 44. After an alarm or trouble signal the switch 40 is restored to its normal position, as shown in the drawings, thereby restoring the circuit to normal for reception of further signals.

Thus upon the occurrence of the slightest flame in the airplane or air conditioning system an instantaneous alarm results since it is not necessary for the circuit to operate at a critical temperature or as a result of a predetermined rate of rise in temperature. In addition the circuit provides trouble supervision for informing the operator of any trouble which might prevent the reception of an alarm.

Figure 8:
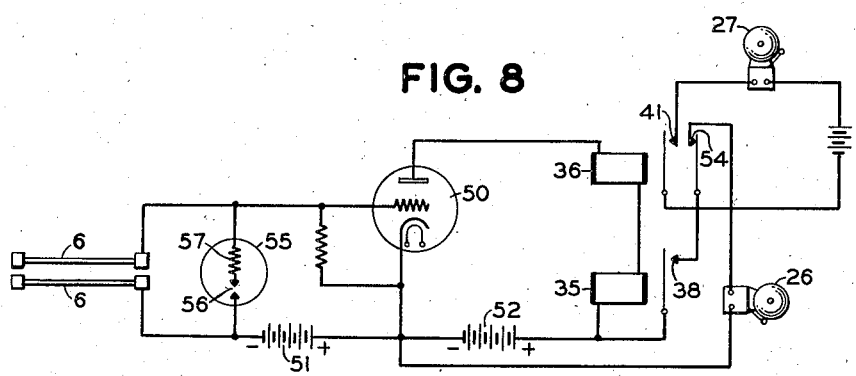
Fig. 8 illustrates a direct current amplifier and an alarm circuit.
Figure 9:
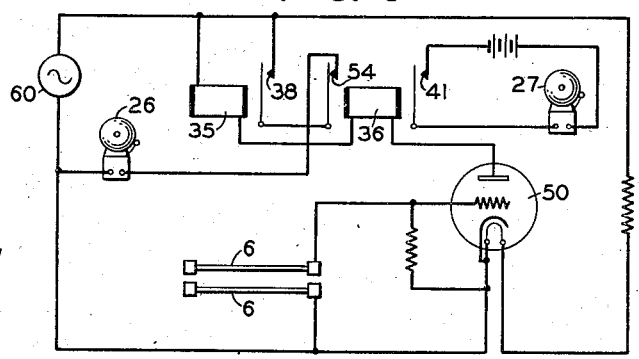
Fig. 9 illustrates an alternating current amplifier and alarm circuit.

Figs. 8 and 9 illustrate further modifications of this invention including the flame detecting electrodes as used in connection with vacuum tube circuits. Fig. 8 illustrates a direct current vacuum tube circuit which includes the fire detecting electrodes 6 connected across the grid circuit of vacuum tube 50 and in series with grid battery 51. The alarm relay 35 and trouble relay 36 are connected in series with the plate of tube 50 and plate battery 52. The trouble relay 36 operates the trouble bell 27 through its contact 41, while relay 35 operates the alarm bell 26 through contacts 38 and 54.

Fig. 8 also illustrates the use of a fire detecting device 55 of the open circuit type such as a thermostat or other heat responsive switch in combination with the fire detecting electrodes 6 and the amplifier 50. The device 55 includes the contacts 56 and resistance 57 the purpose of which is to limit the grid bias and prevent excessive decrease in plate current whereby only the alarm relay 35 is operated. If contacts 56 were to place full grid battery potential on the grid of tube 50, trouble relay 36 would be operated instead of the alarm relay 35.

Fig. 9 illustrates the application of a flame detecting electrode to an alternating current vacuum tube circuit which includes a source of alternating current 60 having the vacuum tube 50 connected in series. The fire detecting electrodes 6 are connected to the grid circuit of tube 50 and the trouble relay 36 and the alarm relay 35 are connected in the output of tube 50. The relay contacts 38, 41, and 54 and the alarm signals 26 and 27 are connected as described above in connection with Fig. 8.

Figure 10:
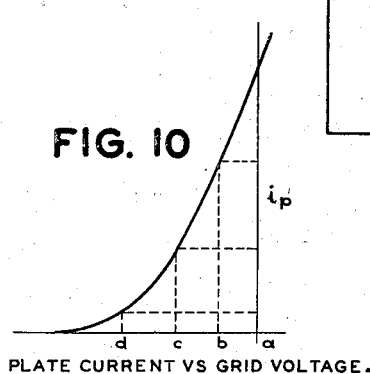
Fig. 10 illustrates the plate-grid characteristic of the circuits shown in Figs. 8 and 9.

The operation of the circuits illustrated in Figs. 8 and 9 may be better understood by referring to Fig. 10 which shows the plate current-grid voltage characteristic of the vacuum tubes used in the circuits. Maximum plate current occurs at zero bias on the grid of the tubes 50, this being the normal condition when there are no breaks within the circuit and no flame between the electrodes 6. Thus relays 35 and 36 are normally energized. When a flame occurs between the electrodes 6, a negative bias appears on the grid sufficient to reduce the plate current a predetermined amount to a value where the alarm relay 35 drops off and closes its contact to initiate an alarm at bell 26. Relay 36 is designed to drop off on less current than alarm relay 35 and does not drop on an alarm. Referring to Fig. 10 the grid voltage would have a value such as c between points b and d depending upon the resistance of the flame itself. At point d the plate current will be sufficiently reduced to drop the trouble relay 36 also but by the proper selection of circuit resistances this point d is not reached in case of a flame passing between the electrodes. A ground on the upper electrode 6, failure of tube 50, failure of the current source, a short circuit between electrodes or a break in the plate circuit will put a greater bias on the grid of the vacuum tube 50 or will decrease the current in the plate circuit a greater amount so that both the alarm relay 35 and the trouble relay 36 will drop off. The trouble alarm 27 will be energized by contact 41, but the contact 54 will break the alarm circuit and therefore prevent a false alarm on bell 26. Thus it is evident that the vacuum tube circuit as well as the electrode circuit is supervised for trouble conditions at all times. It is obvious that the heat responsive device 55 may actuate the alarm in the same manner as electrodes 6.

Figure 11:
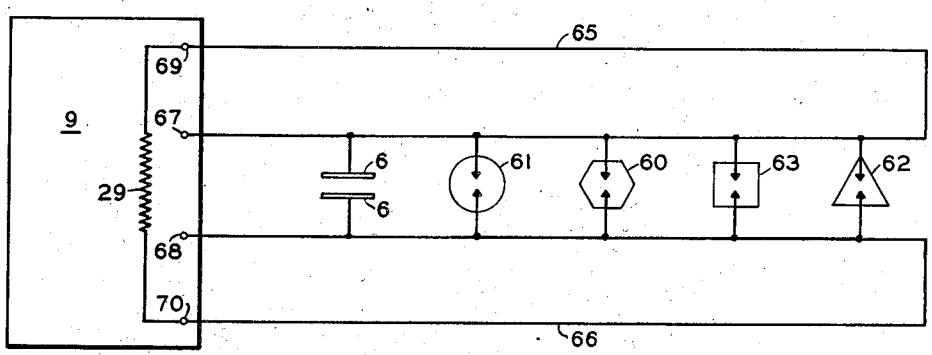
Fig. 11 illustrates the application of flame detecting electrodes in a conventional alarm circuit.

Fig. 11 of the drawings illustrates the application of flame detecting electrodes 6 to a circuit including a manually operated fire alarm station 60, a fixed temperature fire detecting thermostat 61, a water flow detector 62 and a pneumatic rate of rise fire detecting unit 63. This circuit includes conductors 65 and 66 which are terminated at the terminals 67 and 68. A supervisory resistor 29 is connected across terminals 69 and 70 and the other terminals 67 and 68 are connected to a circuit 9 such as shown in Figs. 1 to 9. Thus if any of the fire detecting elements 6, 60, 61, 62 or 63 are actuated they will cause an alarm. If a break or a ground occurs on any of the conductors the supervisory current which normally flows through the resistor 29 will be interrupted and the trouble alarm will be set off as described in connection with the remainder of the circuit.

From the above description it is evident that this invention provides a fire detecting system which does not depend upon temperature change for its operation and is therefore particularly adapted to uses such as in airplanes or air conditioning systems where high velocity air currents prevent substantial temperature changes.

It is further evident from the above description that even though the fire detecting electrodes inherently provide an open circuit device, supervisory equipment is provided and constant trouble supervision is possible.

It is also evident from the above description of this invention that it provides fire detecting apparatus which is not disabled by high velocity air streams and is not subject to false alarm conditions which may occur in such installations as those in airplanes or air conditioning systems. In other words, the apparatus fully accomplishes the results set forth in the objects of the invention.

It is not intended that the fire detecting electrodes be located only in the positions indicated in Figs. 1 to 5 of the drawings as they are equally adapted to be situated in any desirable location either in an airplane or in an air conditioning system. Any dangerous structure may be protected by the flame detecting electrodes. It is also not intended that the use of flame detecting electrodes shall be limited to the specific circuits shown in Figs. 6 to 9 and 11, as it will be obvious to those skilled in the art that a number of different types of bridge circuits or vacuum tube circuits are equally adaptable to the use of electrodes. Various modifications and improvements will occur to those skilled in the art and therefore applicants desire that their invention shall be limited only by the prior art and the scope of the appended claims.

We claim:

1. In a signaling system, a source of potential, a balanced bridge circuit connected across said source and comprising balancing resistors in three arms thereof, a pair of flame detecting electrodes in the fourth arm thereof defining a gap the air at which is normally non-conductive, a supervising resistor connected across said electrodes whereby the bridge is normally balanced, a galvanometer relay connected across said bridge in such fashion that the occurrence of flame between said electrodes creates a conductive path substantially solely by ionization of the air at said gap and unbalances the bridge to deflect the relay in one direction while a break anywhere in the circuit deflects the relay in the opposite direction.

2. In a signaling system, a source of potential, a balanced bridge circuit connected across said source and comprising balancing resistors in three arms thereof, a pair of flame detecting electrodes in the fourth arm thereof defining a gap the air at which is normally non-conductive, a supervising resistor connected across said electrodes whereby the bridge is normally balanced, a galvanometer relay connected across said bridge and having an alarm contact and a trouble contact, an alarm relay connected to the alarm contact and a trouble relay connected to the trouble contact whereby the occurrence of flame between said electrodes creates a conductive path substantially solely by ionization of the air at said gap and unbalances the bridge to deflect the relay in one direction and energize the alarm relay while a break anywhere in the circuit deflects the relay in the opposite direction to actuate the trouble relay.

3. In a signaling system, a source of potential, a Wheatstone bridge circuit connected across said source and including a pair of flame detecting electrodes in one arm thereof defining a gap the air at which is normally non-conductive, and a galvanometer relay across said bridge and an alarm relay connected to the galvanometer relay whereby unbalance of the bridge by the occurrence substantially solely of flame ionization of the air between the electrodes causes deflection of the galvanometer relay.

FRANCIS C. EVANS.
KHATCHIK O. DONELIAN.